United States Patent [19]

Taudt et al.

[11] 3,904,816

[45] Sept. 9, 1975

[54] METHOD FOR THE DOT-BY-DOT AND LINE-BY-LINE REPRODUCTION OF PICTURE ORIGINALS

[75] Inventors: Heinz Taudt; Hans Keller, both of Kiel, Germany

[73] Assignee: Dr. Ing. Rudolf Hell, Germany

[22] Filed: July 19, 1972

[21] Appl. No.: 273,149

[30] Foreign Application Priority Data

July 28, 1971 Germany .......................... 2137676

[52] U.S. Cl. .......................................... 178/6; 358/80

[51] Int. Cl. .......................................... H04n 1/00

[58] Field of Search ......... 178/DIG. 6, 6.6 B, 6.7 R, 178/6; 358/80

[56] References Cited

UNITED STATES PATENTS

| | | | |
|---|---|---|---|
| 3,272,918 | 9/1966 | Koll et al. | 178/6.7 R |
| 3,580,995 | 5/1971 | Klensch | 178/6.7 R |
| 3,588,322 | 6/1971 | Bartel et al. | 178/DIG. 6 |
| 3,621,126 | 11/1971 | Taudt | 178/DIG. 6 |
| 3,646,262 | 2/1972 | Moe | 178/6.7 R |
| 3,657,472 | 4/1972 | Taudt et al. | 178/6.7 R |

*Primary Examiner*—Howard W. Britton
*Assistant Examiner*—Michael A. Masinick
*Attorney, Agent, or Firm*—Hill, Gross, Simpson, Van Santen, Steadman, Chiara & Simpson

[57] ABSTRACT

A method and apparatus for the dot-by-dot and line-by-line reproduction of picture originals, in which local picture dot successions are converted into quantized and digitized chronological picture signal successions by means of optico-electrical scanning of the original, in which the scanned picture signal successions are cooperably associated with other picture and/or masking signal successions, dot-by-dot and line-by-line, in time synchronization, to produce a changed picture signal succession which is utilized for the reproduction. The selection of the picture signal successions to be employed may be determined by one of the picture signal successions, and for example, may involve tone value changes corresponding to color correction and/or gradation changes, as well as provide out-of-focus masking, picture clarification and elimination or undesired contrast imperfections in four-color printing, etc.

40 Claims, 10 Drawing Figures

METHOD FOR THE DOT-BY-DOT AND LINE-BY-LINE REPRODUCTION OF PICTURE ORIGINALS

BACKGROUND OF THE INVENTION

The invention is directed to a method for the dot-by-dot and line-by-line reproduction of picture originals, in which picture information pertaining local picture dot successions desired by optico-electrical scanning of originals are converted into quantized and digitized timed picture signal successions. The term "picture originals" as herein used, is intended to broadly refer to visual representations from which a reproduction is to be produced.

In a prior art method for the rastered reproduction of continuous tone originals (so-called half-tone pictures) the reproduction technique involves the optico-electrical scanning of an original, in which the picture is scanned, line-by-line, employing an optical system, a light source and an optico-electrical converter to produce corresponding electrical picture signals. In this method, the light beam scanning the original may be interrupted in a rhythm or beat which is synchronous to the scanning movement, whereby electrical picture signals are produced which also include such beat.

With another possibility, the light beam may scan the original, line-by-line, without interruption to produce a picture signal which is analogous to the density values of the scanned picture dots of the original. A beat or rhythm synchronous to the scanning movement can then be superimposed upon such picture signal to produce picture signals which also are synchronous with the scanning movement.

The scanning or converting of the visible image of an original to obtain electrical signals can also be derived from a timed succession of picture signals produced from a local succession of picture dots. It is known, in this case, to quantize and digitize the individual signals of the timed picture signal succession to enable them to be recorded in another different rhythm or beat than that at which they were initially recorded, to achieve an enlargement of reduction in the size of the picture reproduced from such picture signals. This prior art method, (German Patent No. 1,193,534), however, only permits the enlarged or reduced reproduction of a single image or picture, which limits the range of application of this reproduction technique to this special operation.

It is also known in the prior art, in connection with picture transmission, to disect an original dot-by-dot and line-by-line, with the picture dots being digitized and transmitted as a timed succession of picture signals, and stored line-by-line or intermediately stored for merely a short period. In this case the digitizing of the picture signals produced by the scanning process is effective to assure a great safeguarding of the picture information during transmission whereby such information is transmitted and re-recorded fault free.

All of such prior art methods involve the transmission or reproduction of a single picture. Consequently, a combination of individual pictures, whether for reproduction or masking purposes, cannot be effected by the use of such methods.

The present invention thus is directed to the problem of effecting a change or intercombining, during reproduction of one or several pictures or picture originals with respect to their picture content. This problem is very frequently involved in printing techniques as there is a great universal necessity of providing high processing safety in the production of printed material involving the changing or combining of picture information.

SUMMARY OF THE INVENTION

The present invention is directed to the achievement of the desired results in such a way that picture signal successions may be associated with each other in timed synchronous dot-by-dot and line-by-line relation, whereby there may be derived therefrom a new picture signal succession for use in the desired recordation.

In a further development of the invention, at least one of the picture signal successions will determine from which picture signal succession the individual signals to be employed in the recordation will be derived. Preferably, the signals of the picture signal succession utilized in the recordation will be employed in accordance with the picture signal succession determining the selection, with or without change in the picture content.

In this connection it is advantageous to utilize picture signal successions for the recordation representing a combination of picture signals of one or several picture signal successions. In accordance with a further advantageous development of the invention one or more constant picture signals may be employed, utilizing in connection therewith the picture signal succession determining the selection, or tone-value changes of the picture signal succession utilized for recordation may correspond to a color correction and/or a gradation change.

Advantageously, the tone value changes may be supplied to an auxiliary memory and subsequently readout with the picture signal succession determining the recordation and combined therewith to form the picture signal utilized for such recordation.

In the event the replaced picture value does not depend upon the present value of a picture dot succession and the replacement is not derived from a further picture dot succession, the picture value may, in an advantageous manner be produced by addition, subtraction or multiplication or division by another value.

The picture signal succession which determines a selection, advantageously is obtained by an electro-optico scanning of a mask. In this case, the picture signal values of the mask may be a constant which is to be added, or may effect a shift in the tone value range in the same manner as would otherwise be possible to add correcting information thereby by means of a separate scanning of the picture under different conditions, analogous to the function of a photographic mask. In many cases, which have not, as yet, been completely solved, it is desired to alter an image dot in dependence on an adjacent dot or dots. In this case it is particularly advantageous that the information of the respective adjacent dots of the picture dot be simultaneously available, and the present invention enables, in correspondence upon interconnection between picture dot and timing rhythm, that the successive picture signal values are conducted to a shift register, in which information pertaining to several adjacent image dots is simultaneously available at any time, whereby the picture signal values may be subjected to a computing linkage whose output result may be employed for effecting a change in the picture values. Advantageously, average value formations and extrapolation calculations may be utilized in such linkages.

The method just described, however, provides merely picture information in the line direction. In some cases, i.e. for the production of an effect corresponding to an out-of-focus masking in the photographic field, it is desired to also include information from adjacent lines in connection with the change of the picture value. According to the invention the values of the picture line which contains the picture dot to be changed and the values of at least one preceding and one following picture line are intermediately stored, whereby each line is provided with its own shift register and picture information transferred in line direction. In this manner, it is possible to obtain an out-of-focus signal for clearing up the picture without the necessity of utilizing signals produced from an out-of-focus scanning. Furthermore, it is also possible to modify such picture clearing process by utilization of a masking signal, which for example, is operative to separate flesh-tones from other tones and thus eliminating an image clearing operation (out-of-focus masking) with respect to flesh tones whereby smooth or even skin tones result.

The present invention also provides a solution to a further problem, for example, in four-color printing, enabling the insertion of a tone value into associated color separations at locations where black letters as characters are to be printed with such tone value being equal to the picture tone value appearing closely adjacent to the letter outline. According to the invention this may be obtained in such a way that the value of the masking information characterizing the letter as character will, when it occurs, effect the storage of the picture value which is present at such instance and will effect its transmission into the picture signal succession determining the recordation, as long as such masking signal is present. This preferably may be obtained by suitable control of the shifting rhythm of the shift register.

The formation of the masking information also forms a part of the present invention, in which actual masks, as derived in known scanning techniques, advantageously may be used. In accordance with the invention, this can be achieved by mounting the mask upon a scanning device and suitably scanned, timing signals being simultaneously produced during the scanning operation determining the local association of the mask picture dots, and the mask scanning values digitized in the rhythm of such timing signals. In order to obtain more complicated masking information the present invention proposes that the digital masking information be stored and that the process be repeated with the mounting and scanning of additional different masks, and their digitized values added to the previously stored mask values or suitably associated or processed therewith. This method has important advantages as compared with prior art methods known from analogous scanning techniques. First of all, a desired number of masking signals can be formed. For example, a masking information of only three bits permits the storage of eight different processing signals while heretofore only four could be realized with analogous techniques. The masks do not have to be colored and their information does not have to be united in one mask by difficult hand work. For example, several black and white masks may be initially provided. When the first is scanned, corresponding values 0 and 1 would be produced and stored. During the scanning of a second and subsequent mask 0 and 1 would be primarily produced. The "0" thus may so influence the storage processes that previously stored values would not be changed, while a digital value corresponding to the value of the mask would be stored during a 1. Seven masks thus would result in eight different signals in the masking information which would enable the control of eight different functions of functional combinations.

The masking information with respect to geometrically simple functions such as rectangular picture framing, can be produced by electrical counters instead of by masks and might be simultaneously stored during the scanning of a mask.

If only a few masking signals are required, it may be advantageous to omit storage and immediately utilize the digital values produced during the mask scanning operations for effecting the change in the picture information.

BRIEF DESCRIPTION OF THE DRAWING

In the drawings wherein like reference characters indicate like or corresponding parts.

DETAILED DESCRIPTION OF THE PREFERRED EMBODIMENTS OF THE INVENTION

Figure 1:
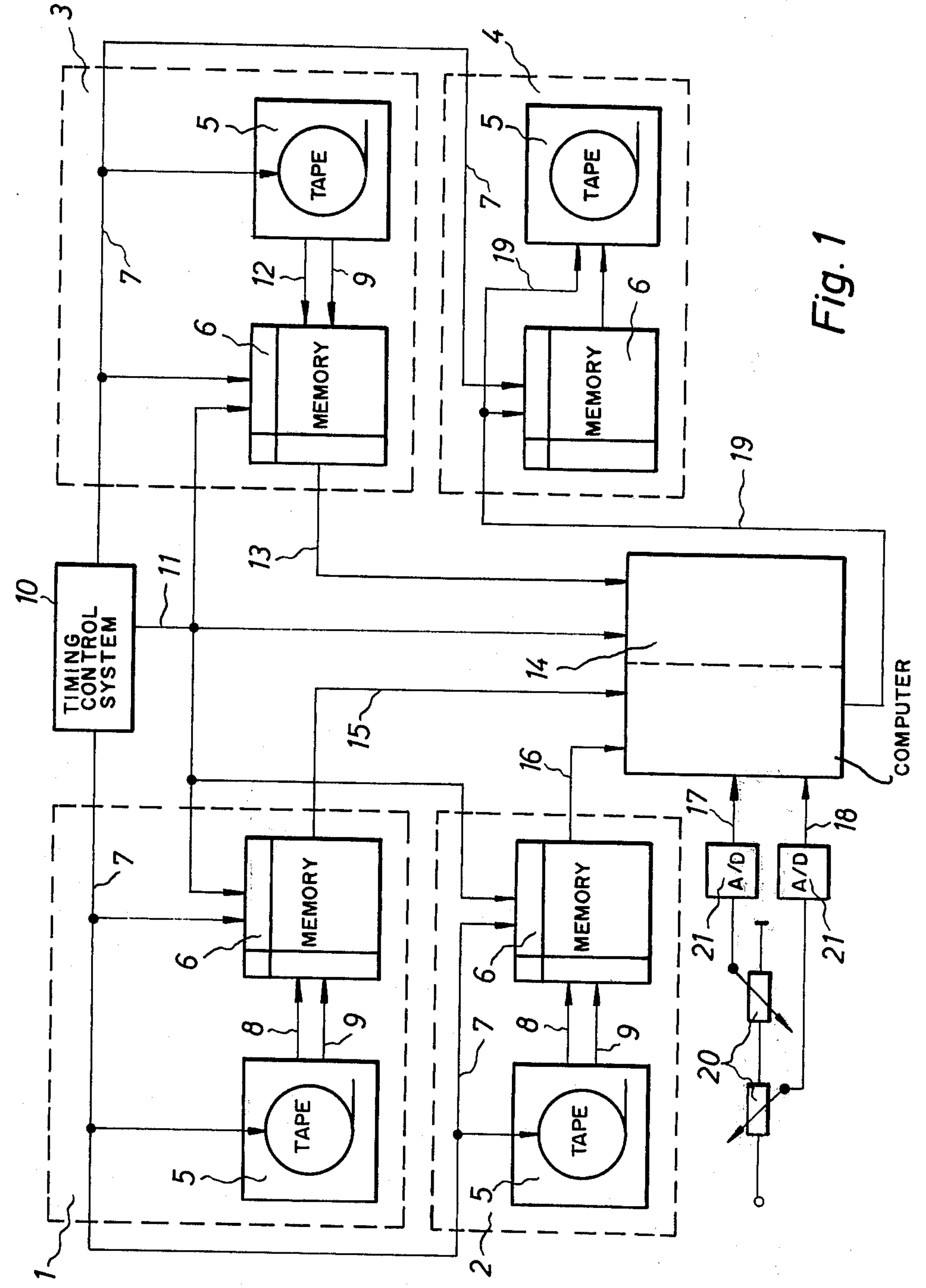
FIG. 1 is a schematic circuit diagram, in block form, of an arrangement for practicing the method of the invention.

FIG. 1 illustrates a typical arrangement for digital picture information processing according to the invention. Data input and output devices 1 through 4 are provided, each consisting of a magnetic tape memory 5 and an intermediate memory 6. Picture signal values comprising six to eight bits and respectively associated with individual picture dots are stored on predetermined tracks of the magnetic tape memory with timing pulse information pertaining to the original picture dot location of the storage values also being stored on an additional track. The data is stored in recording blocks which respectively correspond to a picture line.

In response to external line start signal pulses on line 7 the output values of a picture line are conducted over line 8 to the intermediate memory 6 wherein they are intermediately stored in a rhythm corresponding to pulses supplied over line 9. The line starting timing signals conducted over line 7 are produced by a timing control system 10 which also produced memory interrogation timing signals for the image dot values, which are conducted over line 11 and thus form the equivalent of the timing signals supplied on line 9. The data output from the magnetic tape is continuous with respect to each line, but discontinuous from line to line. Information with respect to two pictures may be available at the input devices 1 and 2 and masking information at the device 3. The device 4 is connected at the picture outlet device in which the changed picture information may be stored, i.e. the picture signal succession which is to serve for the recordation of the tape. The masking information, which will be supplied over the lines 12 and 13 from the device 3, quantatively is less than the picture information conducted over the line 8. Consequently, in order to provide, for example, eight control signals, which usually is sufficient for the desired purposes, only three bits are required per picture dot. The device 3 thus can either be simplified or can be so constructed that it may suitably be designed, for example, for dual usage.

The computer system 14 is operative to carry out various associations, and changes or modifications in the picture signal values and may comprise different combinations of subgroups in dependence upon the specific operation which is to be performed, several examples of which will be hereinafter presented. In the present instance, the new picture information is conducted over line 19 for entry into the device 4 with such information being derived from corresponding masking information supplied to the computer 14 over line 13, from two picture values supplied over lines 15 and 16, and from two constant signal values conducted over lines 17 and 18. The signals on line 13 may, for example, contain four different values corresponding to two bits. The respective values are processed in the computer system 14 in the rhythm of the memory interrogation signals conducted over line 11. The constant signals on lines 17 and 18 may be derived from respective analog voltages for example as derived from potentiometers 20, and respectively converted into digital values in respective analog-digital converters 21. It should be kept in mind that, for the purpose of simplicity of disclosure the respective lines involving digital values, are illustrated in FIG. 1 as single lines, in actual practice, such lines will contain a number of conductors corresponding to the number of bits being conducted.

Figure 2:
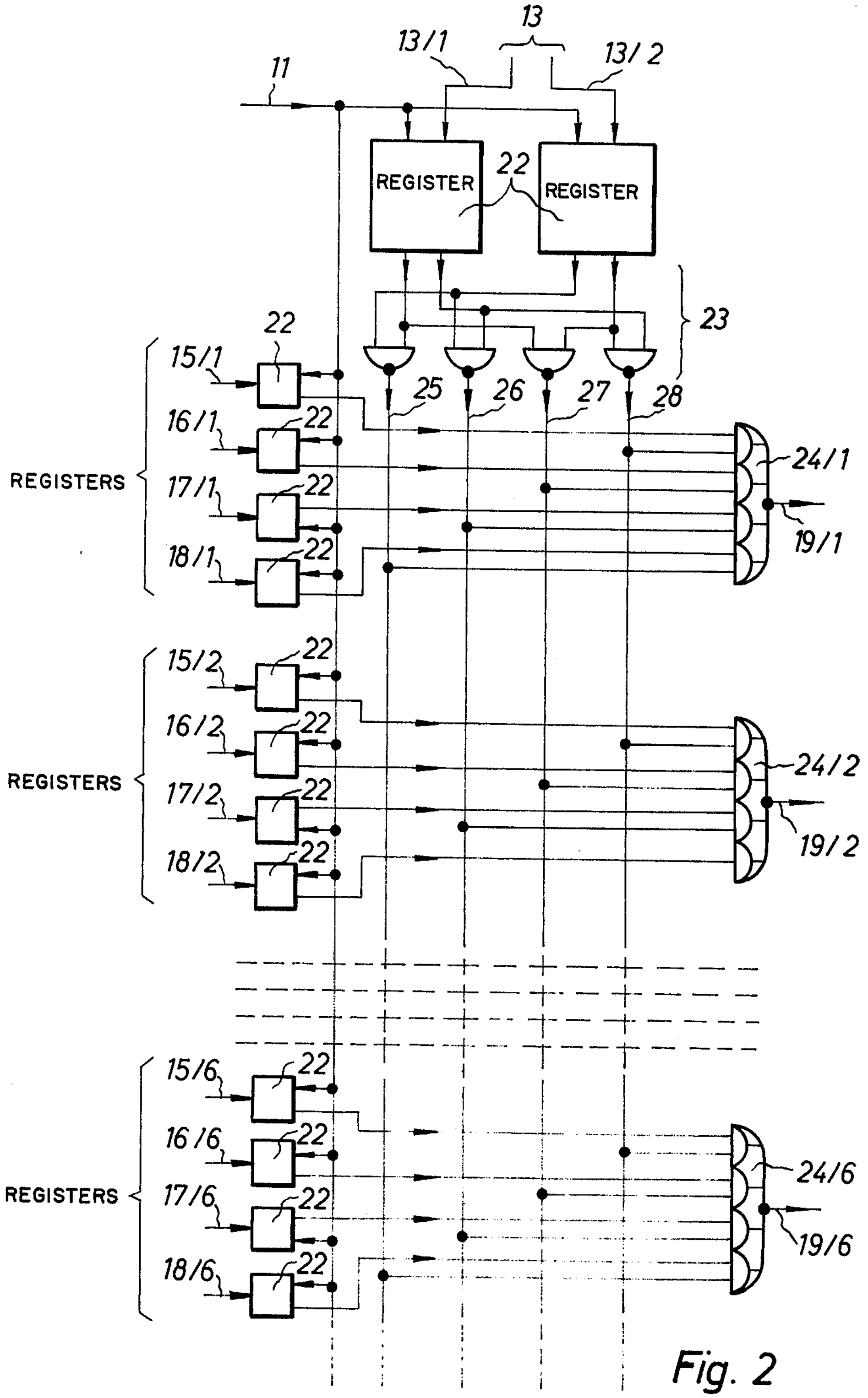
FIG. 2 is a schematic circuit for a computing or calculating system which may be employed in the circuit illustrated in FIG. 1.

FIG. 2 illustrates a computer circuit for the simple case above described, wherein the conductors are illustrated separately for the individual bits and with reference numerals corresponding to those of FIG. 1. 15/1 thus refers to the first bit of the picture signal on line 15, 15/2 to the second bit, 15/3 to the third bit etc. In like manner the remaining conductors of lines 13, 15, 16, 17, 18 and 19 are similarly designated. Transfer registers 22 are provided for the reception and storage of the picture and masking information received on the lines 13, 15, 16, 17 and 18, only the negative output of the registers 22 being used for the picture values. The mask values are determined by a decoding circuit consisting of four AND gates 23, which are controlled by both positive and negative outputs of the transfer registers 22 associated therewith, whereby of the four respective outputs 25 through 28, only one can supply a signal which will open a corresponding AND gate in the respective AND-OR gate combinations 24/1 through 24/6. If for example, line 28 is operatively energized, all six bits of the information signals 15/1 through 15/6 will be passed to the respective outputs 19/1 through 19/6 and utilized for the reproduction. Corresponding operations can take place with respect to lines 16/1 through 16/6, 17/1 through 17/6 and 18/1 through 18/6.

Figure 3:
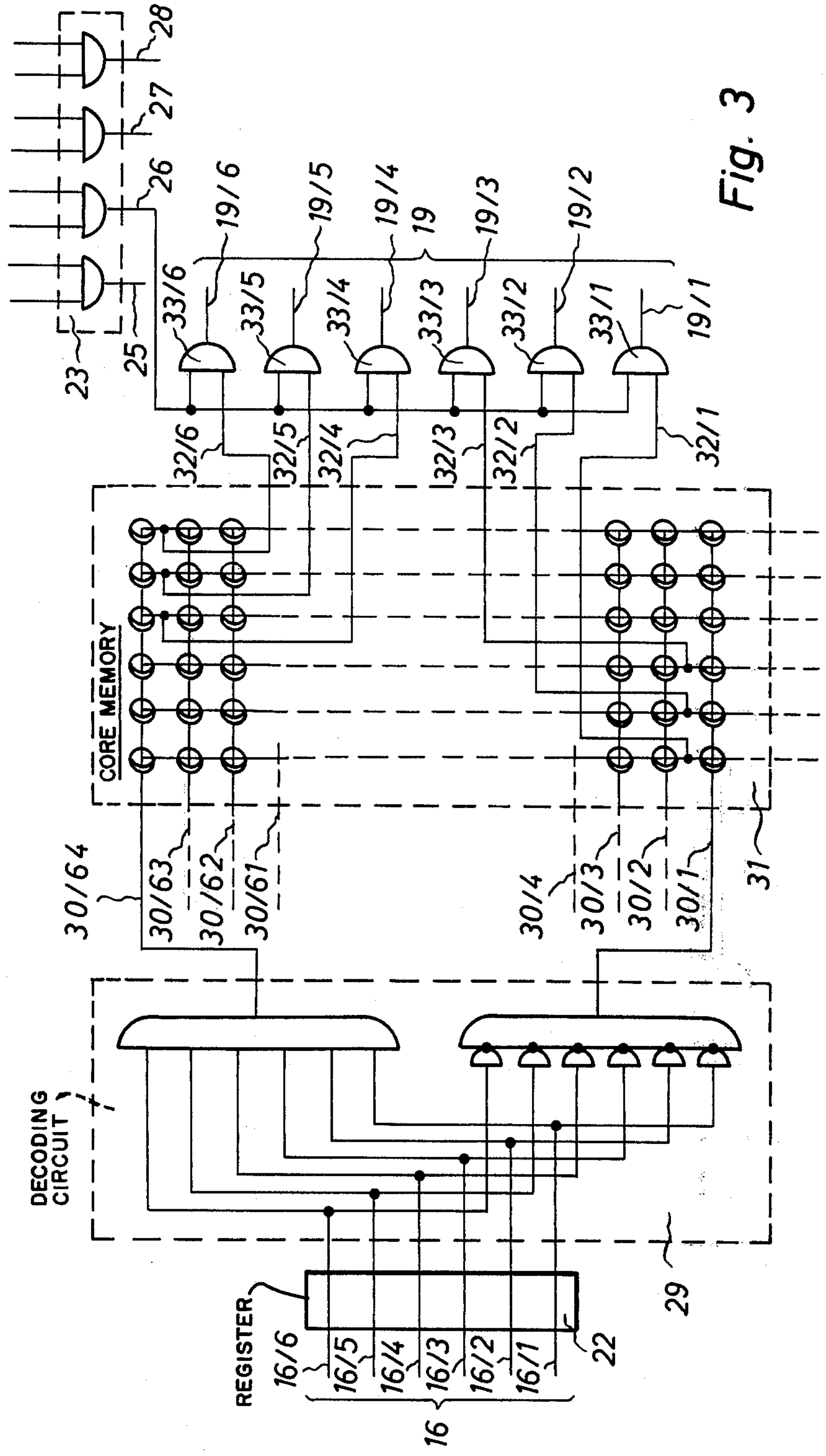
FIG. 3 illustrates a circuit for effecting a gradation change in the picture signal.

FIG. 3 illustrates a circuit for effecting a gradation change in the picture values. In this arrangement the picture signal bits 16/1 through 16/6 are immediately stored in a transfer register 22 for the duration of a picture dot value and conducted to a decoding circuit 29 which, for example, may comprise 64 six input AND gates only two of which are illustrated for simplification. The inputs of the AND gates are inverted in correspondence to the 64 possibilities. Thus, only one of the 64 output lines 30/1 through 30/64 respectively, will carry a positive signal which will form an address for the core memory 31 in which 64 values of six bits are permanently stored (read only). If for example, the line 30/64 is energized, the output lines 32/1 through 32/6 will receive the storage content of the associated six storage cores. Such signal values are supplied to the output lines 19/1 through 19/6 over respective AND gates 33/1 through 33/6 when the output 26 in the decoding circuit 23 of FIG. 2 is positive in accordance with the specific mask information. Otherwise, other picture information can be supplied to the output line 19 by other connecting lines, for example, the unchanged picture signals of line 16. A special case exists when the order or succession of the 64 picture tone values is inverted and thus a negative picture is produced. In this case the decoding and read only memory can be omitted and the picture values supplied in the dual code can simply be inverted. In other cases the fixed value memory can be replaced by more simple circuitry.

Another special case exists when the masking information does not function as a switch over for information provided at another location but is itself the carrier of the entire change information. For example, two bits of the eight bits of the mask information can carry a control signal to provide a four switch-over signals and the other six bits may carry corresponding 64 stage information which corresponds to a picture line illustration. This information may for example, correspond to a color mask of the scanning process during an analogous processing of the picture signals, and may have been produced by a scanning device for addition to the picture value in accordance with the method of the invention.

If, instead of instantaneous processing of only a single image value in accordance with the invention, simultaneously information about the values of adjacent picture dots are made available for the calculation, the picture value changes can then be effected in dependence upon surrounding image dots. In this case, the possibility exists for evaluating only adjacent values within a picture line or to also take into account the values of adjacent lines. As in the latter case adjacent lines would have to be intermediately stored, requiring considerable expense, the first case is considerably simplier, requiring only a small shift register of, for example, 3 to 5 values at 1 byte, respectively, (eight bits).

Figure 4:
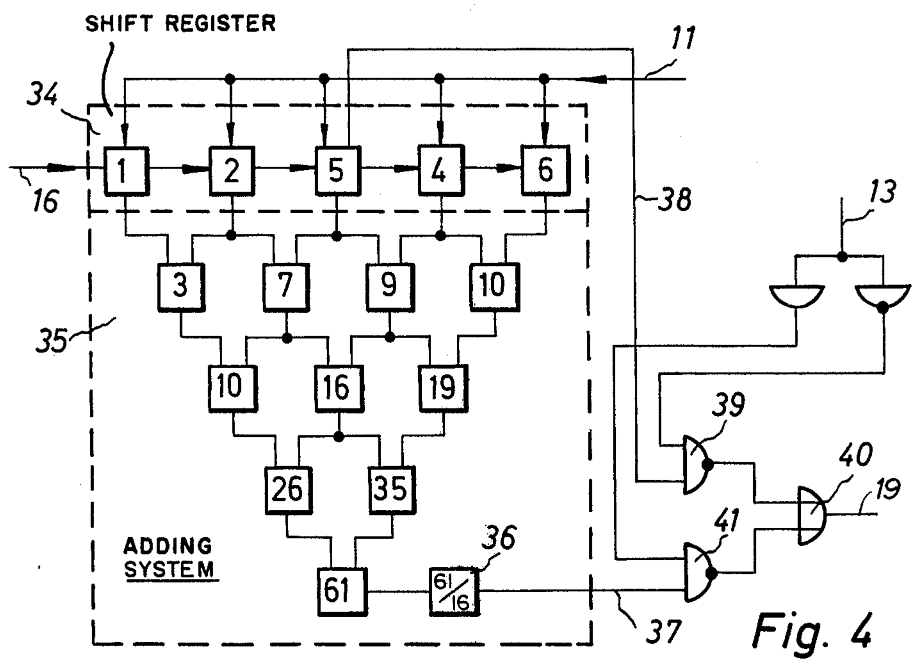
FIG. 4 is a circuit for effecting an average-value formation.

FIG. 4 illustrates an example of a circuit for formation of an evaluated mean value. For example the following case is typical of that occurring in actual practice, in which a picture is taken of a person surrounded by a very detailed landscape. It is desired to sharply reproduce the landscape but it is desired that the skin tones of the person be smooth as possible, i.e. without imperfections or unevenness resulting by grain fluctuations in the picture and for example by general signal noise. In this case, a picture signal of a mask, conducted over line 13, shall designate skin areas or landscape areas by respective values 1 or 0.

In the circuit of FIG. 4 there is provided a shift register 34 for five picture dot values and an adding system 35, wherein two adjacent image dot values are added in cascade-like formation. The numbers appearing in the respective boxes 34 and 35 may represent the picture values at a determined instant, decadically written. By means of timing signals, i.e. a rhythm supplied over the line 11, picture values arriving on the line 16 in the succession (6), (4), (5), (2), (1) are entered into the register 34, with each timing signal shifting the values one number to the right. The center value (5) representing the average is processed to a gate 39 over a line 38 and supplied to the output line 19 over a further gate 40 when the masking signal is 0, i.e. when a landscape is designated. In the other condition, when the masking signal 13 is 1, the values are processed in the adding system 35; and in the output sum (61), the value (5) is strongly evaluated, the values (2) and (4) less strongly and the values (1) and (6) very little. The total value (61) must be divided by the constant divisor, 16 to derive a correct evaluation of the sum as the cascade adding system has a constant multiplication factor of 16. This division is performed in box 36 or the value 5 on the line 38 must be multiplied by 16. In the example, a mean value of 3.8 will be obtained instead of the corresponding value (5), representing a substantial balance or equalization between the adjacent values. Such value is conducted to the output 19 of FIG. 1 over line 37, gate 41 and gate 40 when the masking signal is 1, thus designating skin tones.

Figure 5:
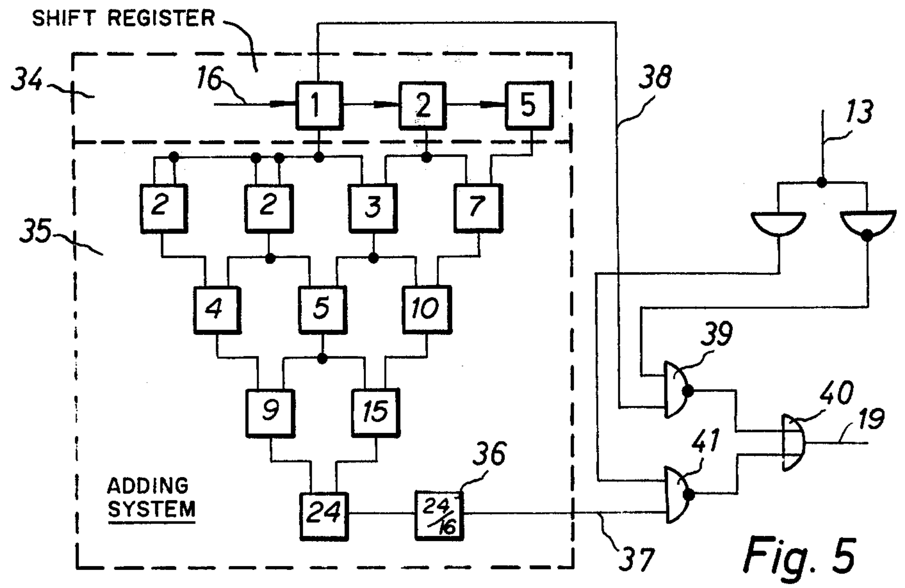
FIG. 5 is a circuit similar to FIG. 4 illustrating a modification of the circuit illustrated in FIG. 4.

Instead of the utilization of the center value (5) in the shift register, the last value to be fed in (1) also can be more strongly evaluated than the other values, for example, can be compensated in an extrapolated manner, of which the circuit of FIG. 5 is an example. In this example the momentary center value is 1. In the first row of adders appear the numbers 2, 2, 3 and 7 representing the addition of the value 1 in the first two adders, the addition of the values 1 and 2 in the third adder and the addition of the values 2 and 5 in the fourth adder. The resulting sum 24 of the cascade adder must be divided by the constant factor 16 to get a correct evaluation of this resulting sum because the cascade adding system has a constant multiplication factor 16.

If the three adjacent picture dot values of the two adjacent picture lines are combined respectively with the value of the processed picture dot and the preceding and following picture dot values, a change of the center picture dot can be calculated from such nine values, corresponding to an out-of-focus masking in the analogous scanning techniques. In this case, the additional advantage here exists that the information of an out-of-focus masking is not necessary, i.e. does not require a separate scanning, but is calculated from the "clear" picture information, and likewise can be changed by suitable mask information with respect to the effective intensity. This change, for example, might also be applied in the above referred to example of landscape versus skin tones.

Figure 6:
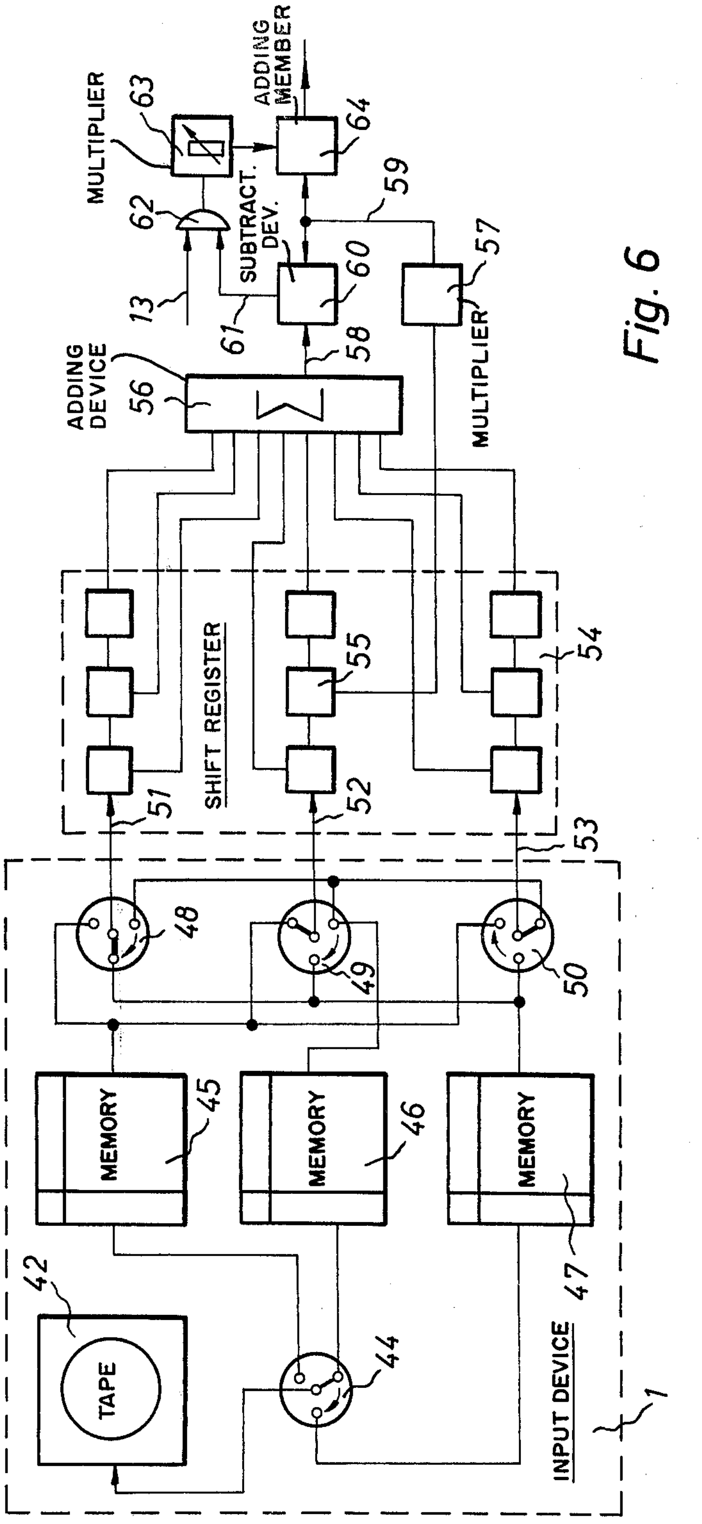
FIG. 6 is a schematic circuit diagram, in block form, for effecting an out-of-focus masking.

FIG. 6 illustrates a circuit and signal paths for effecting such an out-of-focus masking. In this circuit the lines for the respective timing signals with respect to the image dots and picture lines are omitted in order to simplify the presentation. An input device 1, having a tape memory 42, is provided for the processing of the "clear picture information" to three intermediate line memories 45 through 47, under cyclic control of switch 44, for line-by-line storage. The outputs of the line memories are circuited over three additional switches 48, 49 and 50, likewise operating cyclically in the line rhythm in such a way that the values of the mean or center line are always supplied from the output of the line 52 while the line 52 always supplies the values of the preceding picture line, and the line 53 supplies the values of the following picture line.

The picture dot values obtained from the three line memories are supplied to a triple shift register 54, which in this case stores only three picture dot values per line signal. The value representing the mean picture dot, which is to be recalculated, is stored in memory 55. The eight adjacent values represent those surrounding such image dot in the image original, and their values are added in an adding device 56 which, as indicated above, are of equal importance in the average or mean value formation. The center value 55 is multiplied by eight in the multiplier 57 and the difference between the two corresponding values on lines 58 and 59 is then formed in the subtracting device 60 and supplied to an output line 61. The output on line 61, in the presence of a positive masking signal, at the line 13, is then added to the picture signal conducted over the line 59 over a gate 62, multiplier 63 and adding member 64 with the output therefrom being conducted to the output 19. The representation of a variable resistance in the multiplier 63 is intended to represent the adjustability of the latter whereby the multiplication is selectable in order to provide a variation in the overall effect, corresponding to outer field masking in the analogous technique of the prior art.

The method of taking into account information from adjacent picture dots is not only applicable to the picture information but in accordance with the invention may advantageously in some cases be applied to the masking information. As the information content in this case usually is considerably less, the expense with respect to memories etc. likewise will be considerably less.

A typical fault occurs in four-color printing when, for example, a character forming a part of the black print is taken out of the partial color prints by a masking signal of the same size. When the character, appearing in white in the color prints, is not exactly covered in black as a result of the black printing process, a white or colored edge will appear at one side of the character. In order to avoid this as well as similar conditions, one of two steps may be taken, the first involving the shifting of the character edges in the partial character prints inwardly with respect to the portions of the character so that the white representation in the color print is smaller or narrower whereby upon superimposition of the black printing, the black character will overlap into the adjacent edge portions defining the white character. In the other solution, the preceding color signals are not cut-off when a character signal occurs in the color print but the last value is stored and continuously repeated until the end of the character signal whereby a colored surface will be formed in the color combination print within the area of the character, which is approximately equal in color to that of the surrounding. Consequently, a shifting of the black character within the print will not create a conspicuous contrasting edge.

Figure 7:
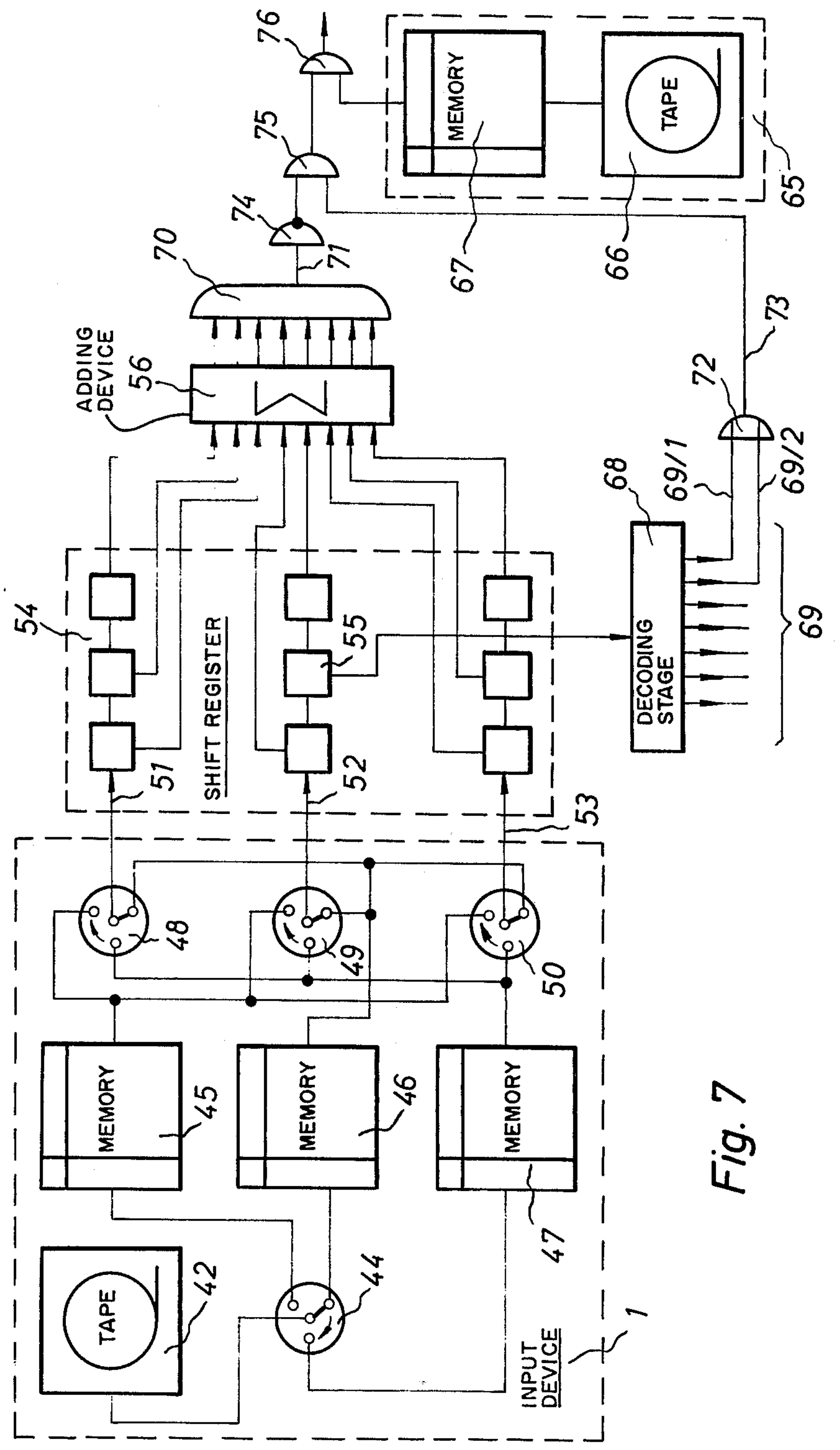
FIG. 7 is a modification of the circuit of FIG. 6 whereby the masking information is derived from a magnetic tape memory.

FIG. 7 illustrates a circuit involving the first mentioned solution to the problem, such circuit employing the general concept illustrated in FIG. 6 and utilizing a corresponding input device 1 and triple shift register 54. The input device 1, in this case will supply the mask information from the magnetic tape memory 42, and since only two or three bits of masking signal are to be processed, instead of six or eight bits of picture values, the cost of such memory will be considerably less. In this arrangement the picture information is supplied by an input device 65 with a tape memory 66 and intermediate memory 67. The mask signal value 55 in the register 54 corresponds to the respective picture dot values at multiple line 69 and is decoded in the decoding stage 68 with the respective signals appearing at the lines 69, i.e. 69/1 and 69/2 respectively. One of these, for example, the signal on line 69/1 will be the character signal.

The adding stage 56 which receives the masking signals for the other surrounding picture dots, likewise contains a decoder. However, the latter merely effects a decoding of the character signal per se and conducts the eight outputs to an eight-input AND gate 70 whose output is positive only when all input values result in character signals. The masking signals at the lines 69/1 and 69/2 represents the picture area signal which is to be imprinted by the characters and are conducted to the OR gate 72. Thus, the signal at line 73 will be positive when the picture area or the character area is supplied. The signal on line 71 is negated in a negator stage 74 and conducted to the AND gate 75 along with the signal on line 73. The signal at the output of the negator 74 thus is positive as long as a positive potential is not present at all outputs of the adder 56 and thus the picture dot does not enter the character area with a complete surrounding of the associated masking dot 55. Up to this point the output of the AND gate 75 is also positive and thus passes the picture signal from the memory 67 to the output 19 over an adder 76, operating as a switch. Only when all masking signals from the adder 56 designating the character signal will the output of the negator 74 be negative and the picture signal transmission interrupted.

Figure 8:
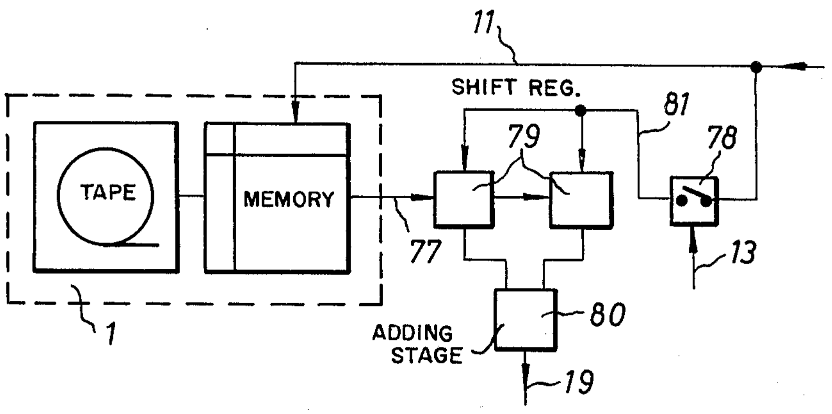
FIG. 8 illustrates a circuit in which the picture signals are entered in a shift register.

In the practice of the second solution, the storage of several masking signal lines will not be required but merely a simple shift register may be utilized for the picture signal values. FIG. 8 illustrates the principal features of such a circuit. In this case, the input device 1 for the picture signal supplies picture dot values over line 77 in a continuous timing rhythm supplied over line 11. The values are supplied in the same rhythm to the shift register 79 during the closure of switch 78 and are further conducted to the output 19 over a value-balancing adding stage 80. When the mask signal, supplied on line 13, designated the character and is positive it will open switch 78, cutting off the signal on line 81 whereby the picture value then appearing in the shift register 79 will be continuously supplied on line 19 until the character signal on line 13 ceases and switch 78 returns to a closed position.

This method, with modification, may be employed when characters of low contrast and poor clarity are already present in the picture signal and are to be replaced by clear characters which are additionally masked in. If the masking characters in this case do not exactly correspond to those of the picture dot during the computing processes or during the subsequent printing, the desired objective will not be obtained. It is then better to remove the characters which are in the picture signal and depending upon the possible size of the area involved or in the prevention measures effected, the cost involved can vary considerably. Thus, for example, the solution illustrated in FIG. 7 can be operatively associated with that illustration in FIG. 8 causing a fixation of the image signal by stopping the shift rhythm to provide the value of the area surrounding the character.

Figure 9:
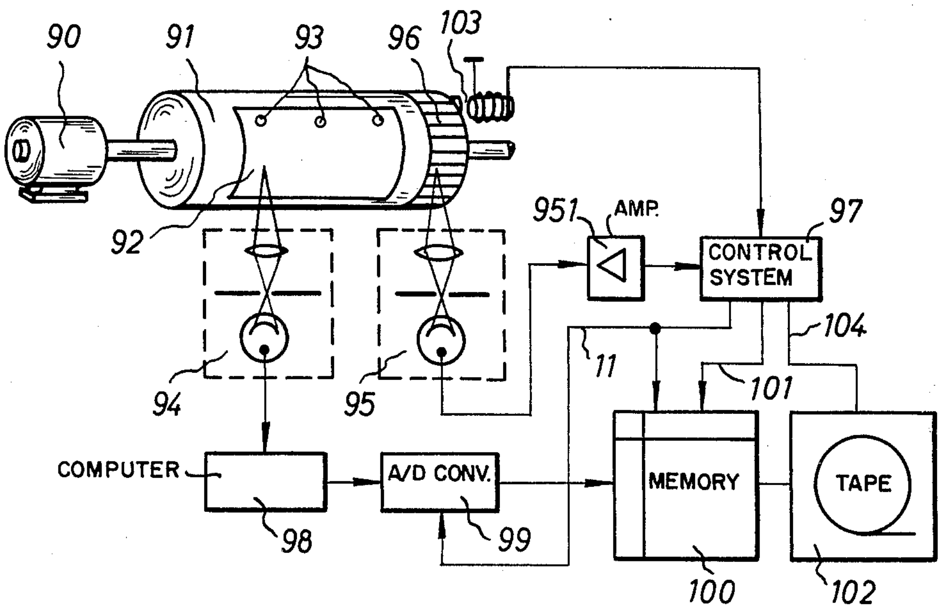
FIG. 9 is a schematic representation of an optico-electrical scanning device for utilization in the practice of the invention.

The derivation of the picture and masking information and their exact local association also comprises a part of the present invention and can be achieved by use of a simple drum scanner, employing optico-electrical scanning, as schematically illustrated in FIG. 9. In this arrangement a motor 90 is operable to rotate a scanning drum 91 which carries the picture to be scanned or a mask 92. The picture is fixedly positioned by means of a plurality of register pins 93, suitable punch means being provided whereby the picture and mask edges may be simultaneously punched to assure accurate scanning registration of the picture or mask on the drum.

The optical scanning system 94, which in the illustration comprises an objective, picture dot screen and photo cell is moved axially in forward direction during rotation of the drum, in accordance with prior art techniques, whereby the picture is scanned dot-by-dot and line-by-line. During the drum rotation, signal pulses are scanned by means of a further optical scanning 95, operable to scan a suitable raster 96, rotating with the drum 91, with the scanning signal being further conducted to a timing control system 97 over an amplifier 951. The timing control system 97, with suitable frequency multiplication of the raster signals, will produce the picture dot rhythm signals appearing on line 11. The picture signal derived from the scanning system 95, after processing in an analog computer 98, is digitized in an analog-digital converter 99 in the rhythm appearing on line 11 and conducted into an intermediate line memory 100. The information is then recalled therefrom, usually with a different picture dot rhythm supplied from the control system 97 over line 101, and is recorded in the magnetic tape memory 102 in the form of informational blocks, in accordance with prior art teachings, whereby a block preferably contains a picture line. The required picture line rhythm may be derived from the scanning control system 97 by utilization of an additional scanning of the drum movement, for example, by means of an impulse pickup solenoid 103, which timing signals are also supplied to the magnetic tape 102 over line 104. However, such timing signals also might be derived from a suitable counting of the signal pulses derived from the optical scanning system 95. While the magnetic tape is considered a preferred storage means for the digitized pictures at this stage of the operation, it will be apparent that the invention is applicable to all types of digital memories.

If a mask is mounted on the drum instead of the picture, in a most simple case, a black and white mask, the same arrangements can be utilized in which case the analog computer 98 can be omitted and the converter 99 reduced to a simple threshold switch. If in accordance with the present invention different picture and masking information is supposed to be combined, insofar as possible. the employment of separate tapes for the information would be avoided and efforts should be made to combine information or suitably process it at the time the information is obtained. This is particularly true with respect to masking information which is of more simple nature, and less applicable to the picture information which is to retained, in stored form, without change, for similar processes at another location or at another time, but derived from the same initial picture.

Figure 10:
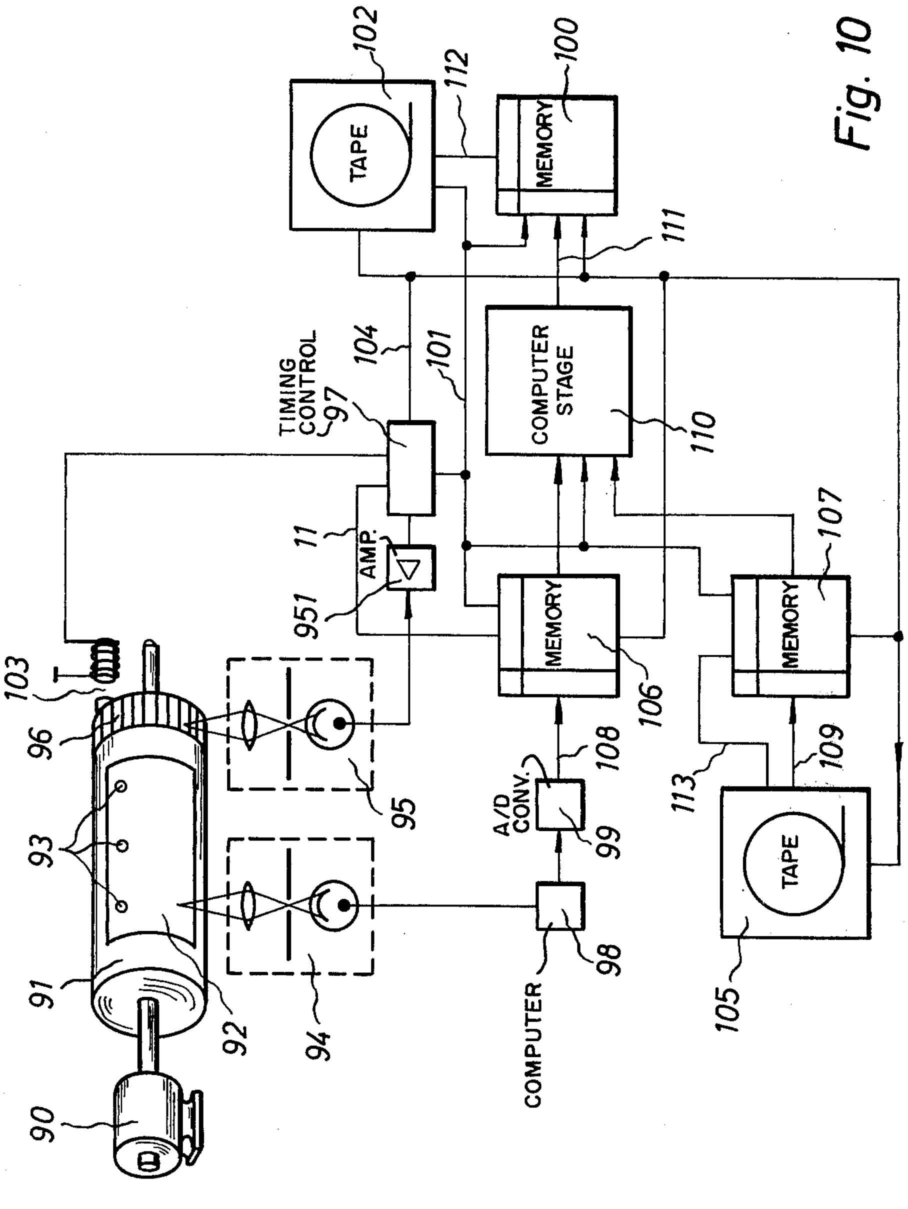
FIG. 10 is a schematic diagram similar to FIG. 9 illustrating a modification of the optico-electrical scanning device.

With the present concepts consideration with respect to technical expense required or whether a general compromise is possible, for example, between high and low costs, do not become of great importance. The arrangement according to FIG. 10 is intended to present an example of an arrangement whereby many different problems can be solved. As will be apparent, the arrangement is similar to that illustrated in FIG. 9 and corresponding components are identified by the same reference numerals. In addition to the previously described circuitry, there is provided a picture memory 105, as well as intermediate line memories 106 and 107, with the memory 106 intermediately storing the signals appearing on line 108, scanned by the scanning system and the memory 107 intermediately storing the signals derived from the tape memory 105 appearing on line 109, which are subsequently conducted to the computer stage 110 with suitable synchronization by means of the rhythm pulses appearing on line 101. The changed signals appearing on the output line 111 from the computer 110 are intermediately stored in the memory 100 and subsequently entered into the output memory 102 over the output line 112, in the line rhythm of the signals appearing on the line 104. An important function of the timing control system 97 is to coordinate the non-synchronous course of the drum 91 with the tape memory 105 whereby the intermediate memories are in a time balance.

It is an important feature that each picture information or mask information is processed into the intermediate memories in their own respective rhythms. Thus, insofar as the picture on the drum is concerned, the timing signals on the line 11 are derived from the raster 96 over the optico-electrical transducer 95, while the timing signals for the tape storage operations are derivied over line 113 from the memory 105. Transfer from the intermediate memories 106 and 107 into the computer system 110 and transfer of the output on line 111 into the intermediate output memory 100 is effected with the rhythm signals appearing on line 101, although this need not be the case, as signals can also be derived from the rhythm signals produced from the raster 96. While the rhythm signals on lines 113, 11 and 101 control transfer of the picture information, dot-wise, the rhythm signals on line 104 will determine the line-by-line transfer, and may be derived from the scanning of the pick-up solenoid 103, and delayed in different manner in the timing control system 97, possibly for the beginning and end of a line, which then start the tape transport and shortly thereafter the output from the intermediate memories. The rhythm signals appearing on line 101 are also entered into the tape device 102 during the storage of the picture dot values in order to retain their association and identification. In principle, it is of no concern, in the arrangement illustrated in FIG. 10, whether the masking information is derived from the scanner and picture information from the memory 105, or whether both process masking information. Only the circuit of the computer system 110 will be suitably designed in correspondence thereto, and as previously described the computer system may take various forms. It will be particularly appreciated that the read-in and read-out rhythm on line 101 can be suitably separated in known mannner and different rhythms employed whereby a change in picture size may be achieved.

Finally, it will be appreciated that the production of the masking dot information should be in exact correspondence with respect to the picture information. Consequently, the picture and mask must coincide exactly with respect to their associated register holes as far as reasonably possible. Either the masking foil and picture are punched separately and then superimposed on a register structure, following which the masking picture is copied onto the foil, by hand, or the picture and prepared mask are exactly superimposed and simultaneously punched. Likewise, the scanning of the picture and mask must involve a drum on like diameter, utilizing like line advancing movements. This is most efficiently and accurately achieved when the same scanning system is utilized for both.

A third solution is to select the same point for starting the production of the information which can be obtained electro-mechanically, electro-optically or a mixture thereof. For example, a suitable mark may be utilized on the drum for operatively connecting the line 101 carrying the line rhythm signals, following the mechanical starting of the scanning operation, and while the electrical transmission by means of optical scanning is still inoperative. The next impulse will switch on the scanning device 95 for the raster 96 and the following impulse will start the transmission. Thereby, the exact start of the transmission, with respect to line and picture dot is assured, even with the utilization of an optical mark which is of somewhat poor clarity.

Although minor modifications might be suggested by those versed in the art, it should be understood that we wish to embody within the scope of the patent warranted hereon all such modifications as might reasonably and properly come within the scope of our contribution to the art.

We claim as our invention:

1. A method for the dot-by-dot and line-by-line reproduction of picture originals, comprising the steps of converting a plurality of series of local picture dot successions, respectively derived from optico-electrical scanning of a plurality of picture originals, into respective series of quantized and digitized chronological picture signal successions, coordinating, dot-by-dot and line-by-line, the successions of one series, in time synchronization, with the successions of another series, and producing, dot-by-dot and line-by-line, from said time synchronized, coordinated series of successions, a series of changed picture signal successions, with the selection of the successions thereof being at least partially dependent upon the content of one of such series, and utilizing said changed series of picture signal successions for the reproduction.

2. A method according to claim 1, wherein a series of picture signal successions are subjected, with picture signals of adjacent picture dots, to a predetermined calculating operation, with the result of such calculation being utilized for effecting the desired change in the picture value.

3. A method according to claim 1, comprising the steps of utilizing, in the selection of the picture signal successions to be employed for the reproduction, at least one picture signal succession, and determining therewith from which individual picture signal successions such selection will be made.

4. A method according to claim 3, comprising utilizing, for the picture signal succession to be employed for the reproduction, a combination of several picture signal successions.

5. A method according to claim 1, wherein tone value changes corresponding to a color correction are effected, in the picture signal successions employed in the reproduction, by predetermined cooperable combination therewith of the picture signal succession determining the selection.

6. A method according to claim 5, wherein the tone value changes and the selected picture signal successions are intermediately stored and correcting the selected picture signal successions with the tone value changes to produce the picture signal successions employed for the reproduction.

7. A method according to claim 1, wherein the picture signal succession determining the selection is produced by the scanning of a mask mounted on a scanner device, simultaneously producing a timing rhythm during the scanning operation for determining the local association of the mask picture dots, and digitizing the mask information in such rhythm.

8. A method according to claim 7, wherein the digitized mask information is stored, repeating the mounting and scanning with further, different masks and adding their digitized values to the previously stored mask values or combined therewith to produce a more complicated mask information which ultimately is employed for changing the picture content.

9. A method according to claim 7, wherein the digital values produced during the mask scanning process are directly utilized for changing the initially stored picture values.

10. A method according to claim 1, wherein tone value changes corresponding to a gradation change are effected, in the picture signal successions employed in the reproduction by cooperable relation therewith of the picture signals succession determining the selection.

11. A method according to claim 10, wherein the tone value changes and the selected picture signal successions are intermediately stored and correcting the selected picture signal successions with the tone value changes to produce the picture signal successions employed for the reproduction.

12. A method according to claim 10, wherein the combination is obtained by utilization of the process of multiplication.

13. A method according to claim 10, wherein the combination is obtained by utilization of the process of subtraction.

14. A method according to claim 10, wherein the combination is obtained by utilization of the process of division.

15. A method according to claim 10, wherein the combination is obtained by utilization of the process of extrapolation.

16. A method according to claim 1, wherein the signals of the picture signal successions employed for the reproduction are supplied with respect to their picture content with change, if a correction of the picture original to be reproduced is required in dependence upon the picture signal succession determining the selection, and without change if a combination of different originals is required in dependence upon the picture signal succession determining the selection.

17. A method according to claim 16, comprising the additional step of selectively providing at least one constant picture signal, and inserting the latter in the picture succession to be reproduced in accordance with the picture signal succession determining the selection.

18. A method according to claim 16, comprising the additional step of selectively providing several constant picture signals, and inserting the latter in the picture succession to be reproduced in accordance with the picture signal succession determining the selection.

19. A method according to claim 16, wherein the change represents an extrapolation calculation.

20. A method according to claim 16, wherein the reproduction selection comprises a combination of the picture signal succession determining the selection and another picture signal succession.

21. A method according to claim 20, wherein the combination represents a mean value formation.

22. A method according to claim 20, wherein the combination is obtained by utilization of the process of addition.

23. A method according to claim 22, wherein the values of the picture line containing the picture dot which is then to be changed, and the values of at least one preceding and one following picture line are intermediately stored, successively shifting the respective values and deriving picture information transverse to the line direction from respective values of such lines.

24. A method according to claim 22, comprising the step of stopping the shifting operation in the presence of a signal value of the picture signal succession determining the selection, and thereby fixing the selected picture signals whereby for the duration of such determining signal, the same picture signals are continuously inserted into the picture signal succession employed for the reproduction.

25. An apparatus for dot-by-dot and line-by-line reproduction of picture originals, wherein local picture signal successions are converted into quantized and digitized timed picture signal successions, by means of optico-electrical scanning of originals, comprising an electronic calculating device operable to process picture-signals from a plurality of sources to form predetermined output picture signals for such reproduction, a plurality of data storage devices each containing picture signals and each operatively connected to supply signal data to said calculating device, a further data storage device connected to receive the calculating results of said calculating device, and timing means operatively connected to the respective devices for controlling the withdrawal of information from the first-mentioned data devices and entry in said calculating device, and the entry of the calculation results of said calculating device into said further data device for ultimate employment in the desired reproduction operations.

26. An apparatus according to claim 25, wherein said calculating device comprises a plurality of transfer registers connected to receive respective signal bits from the respective supplying data devices, an AND/OR gate for each output bit, each gate having an input for the corresponding bit from each data device supplying picture information, further transfer registers connected to receive respective bits from a data device supplying masking information, AND gates operatively connected to the outputs of the last-mentioned transfer registers operative to produce a signal at only one respective gate for each output combination, the outputs of each of such last-mentioned gates being connected to control the operation of the associated AND/OR gates and thus the transfer of bits from one of said data devices to said further data device.

27. An apparatus according to claim 25, wherein said calculating device comprises a decoder to which picture signals are supplied from a data device and which determines the particular combination of bit values involved, and a storage matrix having stored therein gradation values for each decoded bit value combination, said decoder being operatively connected to said matrix for reading out corresponding gradation values in dependence upon the decoding result, and gate means operatively connected to said matrix and forming the output of the calculating device, further transfer registers connected to receive respective bits from a data device supplying masking information, and AND gates operatively connected to the outputs of the last-mentioned transfer registers, to produce a signal at only one respective gate for each output combination, the ouputs of said last-mentioned gates being connected to control said gate means at the output of said matrix.

28. An apparatus according to claim 25, wherein at least one of said first-mentioned data devices is connected to supply to said calculating device information relative to picture content, and at least one other of such data devices is connected to supply masking information to said calculating device.

29. An apparatus according to claim 28, wherein each of said data devices comprise a magnetic tape memory, and an intermediate memory arranged to receive information from the associated tape memory, and to supply information to said calculating device.

30. An apparatus according to claim 29, comprising in further combination, means operatively connected to said calculating device for supplying thereto at least one predetermined signal value for entry into the calculations thereof.

31. An apparatus for use in the dot-by-dot and line-by-line reproduction of picture originals, wherein local picture signal successions are converted into quantized and digitized timed picture signal successions, by means of optico-electrical scanning of originals, comprising a shift register having a plurality of stages for the entry of a plurality of successive picture signal bits, a pair of output AND gates, means connecting the output of one of said stages to one of said AND gates, a cascade adding circuit, having a constant multiplying factors connected to the outputs of all of said stages, the output of said cascade circuit being connected to a dividing stage for removal of the multiplying factor of said cascade circuit, the output of said dividing stage being connected to the other of said output gates, and means response to masking information for controlling the respective output gates.

32. An apparatus according to claim 31, wherein the selected register stage is a center stage.

33. An apparatus according to claim 31, wherein the selected register stage is the first stage.

34. An apparatus for use in the dot-by-dot and line-by-line reproduction of picture originals, wherein local picture signal successions are converted into quantized and digitized timed picture signal successions, by means of optico-electrical scanning of originals, comprising a memory for picture signal information in scanned line formation, an intermediate memory for respectively storing information pertaining to each of three adjacent scanned picture lines, a shift register for each memory, switch means for operatively connecting in succession the first memory to each intermediate memory, and for selectively connecting the output of each intermediate memory to the respective shift registers whereby one shift register receives picture information from a predetermined scanning line and the others receive corresponding picture information from the respectively adjacent scanning lines, the output of a central stage of the predetermined line forming an output, an adding device having a constant multiplying factor operatively connected with the other stages of said shift registers operative to add the values therein, the output of said adding device being connected to a dividing stage for removal of the multiplying factor, the output of said dividing stage forming another output, and means for selecting one or the other of said outputs for use in the reproduction operation to provide a clear picture or an out-of-focus masking.

35. An apparatus for use in the dot-by-dot and line-by-line reproduction of picture originals, wherein local picture signal successions are converted into quantized and digitized timed signal successions, by means of optico-electrical scanning of originals, comprising a memory for masking signal information in scanned line formation, intermediate memories for respectively storing information pertaining to each of three adjacent scanned picture lines, a shift register for each memory, switch means for operatively connecting in succession the first memory to each intermediate memory, and for selectively connecting the output of each intermediate memory to the respective shift registers whereby one shift register receives information from a predetermined scanning line and the others receive corresponding picture information from the respectively adjacent scanning lines, the output of a central stage of the predetermined line forming an output, an adding device operatively connected with the other stages of said shift registers and decoder means connected to the outputs of said adding device, the outputs of said decoder means being operatively connected with gate means for controlling the reproduction operation in dependence upon predetermined values at the outputs of said decoder means.

36. An apparatus for use in the dot-by-dot and line-by-line reproduction of picture originals, wherein local picture signal successions are converted into quantized and digitized timed picture signal successions, by means of optico-electrical scanning of originals, comprising memory means supplying picture signals, a shift register operative to receive a succession of signals from said memory, a value balancing stage connected to the outputs of the respective register stages operative to balance the respective output values thereof, the output of said balancing stage forming the output, and switch means responsive to masking signals for controlling the shifting operation of said register.

37. An apparatus for use in the dot-by-dot and line-by-line reproduction of picture originals, wherein local picture signal successions are converted into quantized and digitized timed picture signal successions, by means of optico-electrical scanning of originals, comprising a scanning drum on which picture material, i.e. picture or mask, is mounted, raster means associated with said drum, means for scanning said picture material and for scanning said raster to produce timing signals, means cooperable with said drum for deriving line-determining timing signals, an intermediate memory, the output of which is connected to a tape memory, an analog computer arranged to receive the output of said picture scanning means, an analog-digital converter connected to receive the output of said computer, the output of said converter being operatively connected to an input of said intermediate memory, a timing control system to which said raster scanning means and said line determining means are connected, operative to supply timing signals to said converter, intermediate memory and tape memory for controlling the operation thereof and for supplying timing signals to an input of said intermediate memory for ultimate storage in said tape memory.

38. An apparatus according to claim 37, wherein there is interposed between said intermediate and tape memories, a computer and a further intermediate memory, the output of which is connected to said tape memory, a second tape memory for storing picture signals, and a cooperable intermediate memory, the input of which is connected to said second tape memory and the output of which is connected to said computer, all of said additional memories and said computer being operatively connected with said timing system for control by the latter.

39. An apparatus according to claim 37, wherein said line signal determining means comprises further means on said drum and cooperable pickup means associated therewith.

40. An apparatus according to claim 39, wherein said line signal determining means comprises further means on said drum and cooperable pickup means associated therewith.

* * * * *